United States Patent
Yanagibayashi (10) Patent No.: US 11,098,702 B2
(45) Date of Patent: Aug. 24, 2021

(54) LIQUID DELIVERY DEVICE AND FLUID CHROMATOGRAPH

(71) Applicant: Shimadzu Corporation, Kyoto (JP)

(72) Inventor: Jun Yanagibayashi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 113 days.

(21) Appl. No.: 16/496,740

(22) PCT Filed: Apr. 26, 2017

(86) PCT No.: PCT/JP2017/016566
§ 371 (c)(1),
(2) Date: Sep. 23, 2019

(87) PCT Pub. No.: WO2018/198234
PCT Pub. Date: Nov. 1, 2018

(65) Prior Publication Data
US 2020/0032780 A1 Jan. 30, 2020

(51) Int. Cl.
*F04B 11/00* (2006.01)
*F04B 27/02* (2006.01)
(Continued)

(52) U.S. Cl.
CPC .......... *F04B 11/0075* (2013.01); *F04B 27/02* (2013.01); *F04B 27/12* (2013.01);
(Continued)

(58) Field of Classification Search
CPC ...... F04B 11/0075; F04B 27/02; F04B 27/12; G01N 30/32; G01N 2030/326; B01D 15/40
See application file for complete search history.

(56) References Cited

U.S. PATENT DOCUMENTS 8,297,936 B2 10/2012 Witt et al.
8,535,016 B2 9/2013 Corral et al.
(Continued)

FOREIGN PATENT DOCUMENTS

CN 105986993 A 10/2016
EP 2 136 081 A1 12/2009
(Continued)

OTHER PUBLICATIONS

International Search Report and Written Opinion dated Jul. 25, 2017 in corresponding application No. PCT/JP2017/016566; 13 pages.
(Continued)

*Primary Examiner* — Benjamin L Lebron
(74) *Attorney, Agent, or Firm* — Maier & Maier, PLLC (57) ABSTRACT

A liquid delivery device includes a pump head having a pump chamber provided in the inside, a plunger whose tip is slidably inserted into the pump chamber, and at least one plunger pump having a drive mechanism that reciprocates the plunger in its axial direction. Then, at least one of the plunger pumps is a pressurizing pump that pressurizes a mobile phase including a compressible fluid sucked into the pump chamber and then discharges the mobile phase from the pump chamber, and at least the pump head of the pressurizing pump includes a cooling part that is connected to an outlet channel from the pump chamber, and allows the pump head to absorb heat of the mobile phase discharged from the pump chamber to cool the mobile phase.

10 Claims, 7 Drawing Sheets

(51) Int. Cl.
*F04B 27/12* (2006.01)
*G01N 30/32* (2006.01)
*B01D 15/40* (2006.01)

(52) U.S. Cl.
CPC .............. *G01N 30/32* (2013.01); *B01D 15/40* (2013.01); *G01N 2030/326* (2013.01)

(56) References Cited

U.S. PATENT DOCUMENTS

| | | | |
|---|---|---|---|
| 9,360,006 B2 | 6/2016 | Herzog et al. | |
| 2008/0080981 A1 | 4/2008 | Witt et al. | |
| 2010/0299079 A1 | 11/2010 | Berndt et al. | |
| 2013/0334117 A1 | 12/2013 | Joudrey et al. | |
| 2014/0190183 A1* | 7/2014 | Berger | F25B 21/02 62/3.2 |
| 2016/0274071 A1 | 9/2016 | Yamamoto | |
| 2017/0028402 A1 | 2/2017 | Hishida | |

FOREIGN PATENT DOCUMENTS

| | | |
|---|---|---|
| JP | 2002-207031 A | 7/2002 |
| JP | 2003-207491 A | 7/2003 |
| JP | 2008-151595 A | 7/2008 |
| JP | 2009-115627 A | 5/2009 |
| JP | 2014-517179 A | 7/2014 |
| JP | 2017-029136 A | 2/2017 |

OTHER PUBLICATIONS

Extended European Search Report dated Sep. 30, 2020, in connection with corresponding EP Application No. 17907527.0; 7 pages.
Office Action dated Apr. 9, 2021 in corresponding Chinese Application No. 201780089435.X; 19 pages including English-language translation.
Examination Report dated May 2, 2021 in corresponding Indian Application No. 201947044245; 7 pages.

* cited by examiner

LIQUID DELIVERY DEVICE AND FLUID CHROMATOGRAPH

FIELD

The present disclosure relates to a liquid delivery device used to deliver a mobile phase in an analyzer, such as a high performance liquid chromatograph (HPLC) or a supercritical fluid chromatograph (SFC), and a fluid chromatograph including the liquid delivery device.

BACKGROUND

The liquid delivery device used in an HPLC system is required to have the ability to stably deliver a mobile phase at high pressure. For this reason, a liquid delivery device of a double plunger system in which two plunger pumps are connected in series or in parallel is generally used.

For example, in the liquid delivery device in which two plunger pumps are connected in series, a primary side plunger pump on an upstream side and a secondary side plunger pump on a downstream side operate in a complementary manner. As a discharge stroke of the plunger pumps, there are a liquid delivery stroke by the primary side plunger pump and a liquid delivery stroke by the secondary side plunger pump.

In the discharge stroke by the primary side plunger pump, the secondary side plunger pump performs suction operation while the primary side plunger pump discharges liquid, and part of the liquid discharged by the primary side plunger pump is sucked by the secondary side plunger pump. In the discharge stroke by the secondary side plunger pump, the secondary side plunger pump performs discharge operation, and, during the discharge operation, the primary side plunger pump performs suction operation.

In the discharge stroke by the primary side plunger pump, a flow rate obtained by subtracting a suction flow rate of the secondary side plunger pump from a discharge flow rate of the primary side plunger pump is a liquid delivery flow rate of the liquid delivery device. In the discharge stroke by the secondary side plunger pump, the discharge flow rate of the secondary side plunger pump is a liquid delivery flow rate of the liquid delivery device.

Such a liquid delivery device of a series double plunger system is provided with a valve for preventing backflow on each of an inlet side and an outlet side of the primary side plunger pump. When the primary side plunger pump performs the discharge operation, the valve on the inlet side closes, and the valve on the outlet side opens, and when the primary side plunger pump performs the suction operation, the valve on the inlet side opens and the valve on the outlet side closes.

Since the suction operation of the primary side plunger pump is performed in a state where the valve on the outlet side is closed, pressure in a pump chamber of the primary side plunger pump after the suction operation of the primary side plunger pump is finished is in a state of being lower than system pressure (pressure in an analysis channel of an HPLC or an SFC). When, in this state, the pump that performs discharge operation is switched from the secondary side plunger pump to the primary side plunger pump, liquid is not discharged from the primary side plunger pump until pressure in a pump chamber of the primary side plunger pump increases to the same pressure as the system pressure. As a result, the liquid delivery flow rate is temporarily lowered and stability of the liquid delivery flow rate is lowered.

Due to the above problem, during the discharge stroke by the secondary side plunger pump, the primary side plunger pump generally performs pre-compression operation to drive a plunger in a discharge direction so that pressure in a pump chamber can be increased to pressure close to the system pressure, in addition to the suction operation of liquid.

The above similarly applies to a liquid delivery device of a parallel double plunger system in which two plunger pumps are connected in parallel, and while one plunger pump is performing discharge operation, the other plunger pump performs suction operation and pre-compression operation.

When the pre-compression operation is performed, a mobile phase sucked into a pump chamber is compressed to generate heat, and a temperature of the mobile phase increases and the volume is expanded. After the above, in a process of flowing through a channel, the mobile phase discharged from the pump chamber is deprived of heat by a channel wall surface and the like to be cooled, and the volume shrinks. When such volumetric shrinkage occurs, an error occurs between an actual liquid delivery flow rate and an ideal value of a liquid delivery flow rate obtained by the product of a plunger cross-sectional area and a driving speed of the plunger, which causes lowering in liquid delivery accuracy and pulsation.

As a solution to the above problems due to volumetric shrinkage of the mobile phase, a method of performing feedforward control for controlling a plunger speed based on prior knowledge of heat generation and cooling processes of the mobile phase, or a method of performing feedback control for controlling a plunger speed so that system pressure becomes equal to a target value have been proposed (see Patent Documents 1, 2 and 3).

Patent Document 1: U.S. Pat. No. 8,535,016B2
Patent Document 2: U.S. Pat. No. 9,360,006B2
Patent Document 3: U.S. Pat. No. 8,297,936B2
Patent Document 4: US2010/299079A1

SUMMARY

In a case where feedforward control is performed to control a plunger speed based on prior knowledge of heat generation and cooling processes of the mobile phase, reproducibility is required for the heat generation and cooling processes of the mobile phase. In particular, when the reproducibility of the cooling process of the mobile phase after being discharged from a pump chamber is low, volumetric shrinkage of the mobile phase after being discharged becomes unstable, which causes lowering in the liquid delivery accuracy.

In view of the above, an object of the present invention is to improve the reproducibility of the cooling process of a fluid in a compressed state that is discharged from a plunger pump.

A liquid delivery device according to the present invention includes one or more plunger pumps which comprises a pump head having a pump chamber provided in the inside, a plunger whose tip is slidably inserted into the pump chamber, and a drive mechanism that reciprocates the plunger in an axial direction thereof. At least one of the plunger pumps is a pressurizing pump that pressurizes a mobile phase including a compressible fluid sucked into the pump chamber and then discharges the mobile phase from the pump chamber. At least the pump head of the pressurizing pump includes a cooling part that is connected to an outlet channel from the pump chamber and causes the pump head to absorb heat of a mobile phase discharged from the pump chamber to cool the mobile phase.

Here, the "pressurizing pump" in the present invention refers to a pump that pressurizes a mobile phase sucked into the pump chamber, that is, performs pre-compression operation, and then discharges the mobile phase in the pump chamber. In a liquid delivery device of a series double plunger system, the primary side plunger pump corresponds to the "pressurizing pump" in the present invention, and, in a liquid delivery device of a parallel type double plunger type, both the plunger pumps correspond to the "pressurizing pump" in the present invention.

Patent Document 4 discloses that a heat exchange channel is provided in a pump head of a secondary side plunger pump of a liquid delivery device of a series type double plunger system, and a temperature of a mobile phase discharged from a primary side plunger pump (pressurizing pump) is made equal to that of a pump head of the secondary side plunger pump. In this disclosed technique, since the heat exchange channel is provided on the pump head of the secondary side plunger pump, a mobile phase that generates heat flows through a pipe (referred to as the primary side outlet pipe) that connects the pump head of the primary side plunger pump and the pump head of the secondary side plunger pump. However, since a temperature of the primary side outlet pipe periodically fluctuates due to the heat-generating mobile phase discharged from the primary side plunger pump, and the primary side outlet pipe has small heat capacity and is also exposed to outside air, the temperature of the primary side outlet pipe is unstable. In such a structure in which the mobile phase is cooled in a portion that is unstable in terms of temperature, the reproducibility of a cooling process of the mobile phase is not considered excellent.

In contrast, in the liquid delivery device according to the present invention, a pump head of a pressurizing pump that performs pre-compression operation is provided with a cooling part that is connected to an outlet channel from a pump chamber and cools a mobile phase discharged from the pump chamber by causing the pump head to absorb heat of the mobile phase. Accordingly, a fluid discharged from the pump chamber is cooled to substantially the same temperature as the pump head of the pressurizing pump and then delivered to the outside of the pump head. As a result, the mobile phase cooled to substantially the same temperature as the pump head flows in an external pipe, such as a primary side outlet pipe connected to the pressurizing pump. In this manner, cooling of the mobile phase in a pipe that is unstable in terms of temperature is restricted, and the reproducibility of the cooling process of the mobile phase is improved.

In a preferred embodiment, the cooling part is configured with a flat plate-shaped channel in which a ratio of an internal surface area to internal capacity is larger than that of the outlet channel.

Further, the cooling part may be configured with a plurality of channels having a smaller cross-sectional area than the outlet channel, or a meandering channel having a smaller cross-sectional area than the outlet channel.

In a further preferred embodiment, one wall surface of a channel forming the cooling part is configured to generate an elastic strain in accordance with pressure in the channel. The embodiment further includes a strain detection part that detects an amount of strain of the wall surface, and a pressure detection part that detects pressure in the cooling part based on an amount of strain of the wall surface detected by the strain detection part. In this manner, liquid delivery pressure of the pressurizing pump can be detected using the cooling part provided in the pressurizing pump. If the fluid delivery pressure of the pressurizing pump can be detected, the pre-compression operation of the pressurizing pump can be controlled with high accuracy based on the detected value.

Further, a calorific value calculation part that calculates a calorific value of a mobile phase in the pump chamber based on a change amount of a pressure value detected by the pressure detection part may be further included. The calorific value of the mobile phase by the pre-compression operation can be calculated by the pressure detection part based on a pressure increase amount during the pre-compression operation of the pressurizing pump. The calorific value of the mobile phase can be calculated with a proportional coefficient between the pressure increase amount and the calorific value as $\beta T/C_p\rho$, where a coefficient of thermal expansion of a fluid is $\beta$, a temperature is T, specific heat at constant pressure is $C_p$, and density is $\rho$.

In a case where feedforward control of the pressurizing pump is performed based on the calorific value of the mobile phase, a discharge flow rate of the pressurizing pump can be controlled as described below according to the magnitude of the pressure increase amount during pre-compression operation of the pressurizing pump.

When the pressure increase amount during the pre-compression operation of the pressurizing pump is large, it is predicted that the calorific value of the mobile phase is large and the volumetric shrinkage due to the cooling of the mobile phase is large. For this reason, a compensation flow rate for setting a flow rate actually delivered from the pressurizing pump to a predetermined delivery flow rate is set to be large, and the discharge operation of the pressurizing pump is controlled based on the compensated flow rate. In contrast, when the pressure increase amount during the pre-compression operation of the pressurizing pump is small, it is predicted that the calorific value of the mobile phase is small and the volumetric shrinkage due to the cooling of the mobile phase is small. For this reason, the compensation flow rate is set to be small, and the discharge operation of the pressurizing pump is controlled based on the compensation flow rate.

Furthermore, when a pressure change per part time during the pre-compression operation is large, it is assumed that the compression of the mobile phase is more adiabatic and the heat generation of the mobile phase is large, so the compensation flow rate is made large. In contrast, when the pressure change per part time during the pre-compression operation is small, it is assumed that the compression of the mobile phase is more isothermal and the heat generation is small, so the compensation flow rate is made small.

Further, a temperature detection part that detects the temperature of the cooling part may be further provided. If the temperature detection part for detecting the temperature of the cooling part is provided, it is possible to detect a temperature change of the mobile phase in the pump chamber of the pressurizing pump.

In this case, a calorific value calculation part that calculates a calorific value of the mobile phase in the pump chamber based on a change amount of a temperature detected by the temperature detection part is preferably further included. If the calorific value of the mobile phase in the pump chamber of the pressurizing pump can be calculated, the feedforward control of the pressurizing pump described above can be performed. Specifically, when the temperature change amount of the mobile phase during the pre-compression operation of the pressurizing pump is large, it is predicted that the calorific value of the mobile phase is large and the volumetric shrinkage due to cooling of the mobile phase is large, so the compensation flow rate is made larger. In contrast, when the temperature change amount of the mobile phase during the pre-compression operation is small, it is predicted that the calorific value of the mobile phase is small and the volumetric shrinkage due to cooling of the mobile phase is small, so the compensation flow rate is reduced.

Further, both the strain detection part and the temperature detection part described above may be provided. At this time, each detection part can be used to calculate the calorific value of the mobile phase as described above. Furthermore, the temperature detection part can also be used to correct the temperature characteristics of the strain detection part. In this manner, even in a case where the temperature of the strain detection part changes due to heat generation of the mobile phase, the output of the strain detection part can be corrected using the temperature detected by the temperature detection part, and an accurate pressure can be measured.

In a case where the ambient temperature of the pressurizing pump fluctuates, the outlet pipe connected to the pump head of the pressurizing pump is easily affected, while the pump head has a larger heat capacity than the outlet pipe. For this reason, there is a temperature difference between the outlet pipe and the pump head. Then, the temperature of the mobile phase cooled to substantially the same temperature as the pump head in the cooling part provided in the pump head may change at the outlet pipe, which may impair the reproducibility of the cooling process of the mobile phase.

In view of the above, an outlet pipe which is disposed outside the pump head of the pressurizing pump and communicates with the outlet channel of the pressurizing pump is preferably covered with a heat insulating member. Then, the temperature of the outlet pipe becomes stable, and a temperature difference does not easily occur between the pump head and the outlet pipe. In this manner, the reproducibility of the cooling process of the mobile phase can be improved.

A fluid chromatograph at least includes an analysis channel, the above liquid delivery device that delivers a mobile phase in an analysis channel, a sample injection part that injects a sample into the analysis channel, a separation column that is provided downstream of the sample injection part on the analysis channel, and separates a sample injected into the analysis channel by the sample injection part into components, and a detector that is provided downstream of the separation column on the analysis channel and detects a sample component separated by the separation column. The "fluid chromatograph" means an analyzer, such as an HPLC or an SFC, that performs analysis while causing a fluid to flow as a mobile phase.

In the liquid delivery device according to the present invention, a pump head of a pressurizing pump that performs pre-compression operation is provided with a cooling part that is connected to an outlet channel from a pump chamber and cools a mobile phase discharged from the pump chamber by causing the pump head to absorb heat of the mobile phase. Accordingly, a fluid discharged from the pump chamber is cooled to substantially the same temperature as the pump head of the pressurizing pump and then delivered to the outside of the pump head. As a result, the mobile phase cooled to substantially the same temperature as the pump head flows in an external pipe, such as a primary side outlet pipe connected to the pressurizing pump. In this manner, cooling of the mobile phase in a pipe that is unstable in terms of temperature is restricted, and the reproducibility of the cooling process of the mobile phase is improved. By improving the reproducibility of the cooling process of the mobile phase, the reproducibility of processes of expansion and shrinkage of the volume of the mobile phase is improved, and control of a liquid delivery flow rate in anticipation of expansion and shrinkage of the volume of the mobile phase is facilitated.

The fluid chromatograph according to the present invention uses the above-described liquid delivery device as a liquid delivery device for delivering the mobile phase. Accordingly, liquid delivery with little influence from expansion and shrinkage of the volume of the mobile phase is performed, which improves the accuracy and reproducibility of analysis.

DETAILED DESCRIPTION

Hereinafter, a liquid delivery device and a fluid chromatograph according to the present invention will be described with reference to the drawings.

First, one embodiment of the liquid delivery device will be described with reference to FIG. 1.

A liquid delivery device 1 of this embodiment is a liquid delivery device in a series double plunger system in which a plunger pump 2a (hereinafter, the primary side plunger pump 2a) and a plunger pump 2b (hereinafter, the secondary side plunger pump 2b) are connected in series with each other. In pump heads 4a and 4b of the primary side plunger pump 2a and the secondary side plunger pump 2b, pump chambers 6a and 6b, inlet channels 8a and 8b, and outlet channels 10a and 10b are provided, respectively.

A tip of a plunger 12a is slidably inserted in the pump chamber 6a of the primary side plunger pump 2a. The plunger 12a is reciprocated in an axial direction by a drive mechanism 14a. A tip of a plunger 12b is slidably inserted in the pump chamber 6b of the primary side plunger pump 2b. The plunger 12b is reciprocated in an axial direction by a drive mechanism 14b. The drive mechanisms 14a and 14b include, for example, a cam mechanism and a motor for driving the cam mechanism, and a ball screw mechanism and a motor for driving the ball screw mechanism.

The inlet channel 8a of the primary side plunger pump 2a has one end communicating with the pump chamber 6a, and the other end connected to an inlet pipe 18 via a check valve 16a. The check valve 16a is provided to be opened in response to pressure reduction in the pump chamber 6a when the plunger 12a is driven in a suction direction (a direction to be pulled out from the pump chamber 6a), and to be closed in response to pressurization in the pump chamber 6a when the plunger 12a is driven in a discharge direction (a direction to be pushed into the pump chamber 6a).

A cooling block 20 made from a heat conductive material, such as metal, is attached to the pump head 4a of the primary side plunger pump 2a. In the cooling block 20, a cooling part 22, an inflow channel 24, and an outflow channel 26 are provided. One end of the inflow channel 24 leads to the cooling part 22, and the other end of the inflow channel 24 is connected to the outlet channel 10a leading to a tip of the pump chamber 6a via a joint 28. In this manner, the pump chamber 6a and the cooling part 22 communicate with each other via the outlet channel 10a, the joint 28, and the inflow channel 24. One end of the outflow channel 26 communicates with the cooling part 22, and the other end of the outflow channel 26 is connected to a primary side outlet pipe 30.

The inlet channel 8b of the secondary side plunger pump 2b has one end communicating with the pump chamber 6b, and the other end connected to the other end of the primary side outlet pipe 30 via a check valve 16b. The check valve 16b is provided to be opened when pressure in the pump chamber 6a is higher than pressure in the pump chamber 6b, and to be closed when the pressure in the pump chamber 6a is lower than the pressure in the pump chamber 6b. One end of the outlet channel 10b communicates with a tip of the pump chamber 6b, and the other end of the outlet channel 10b is connected to a secondary side outlet pipe 38.

Figure 3:
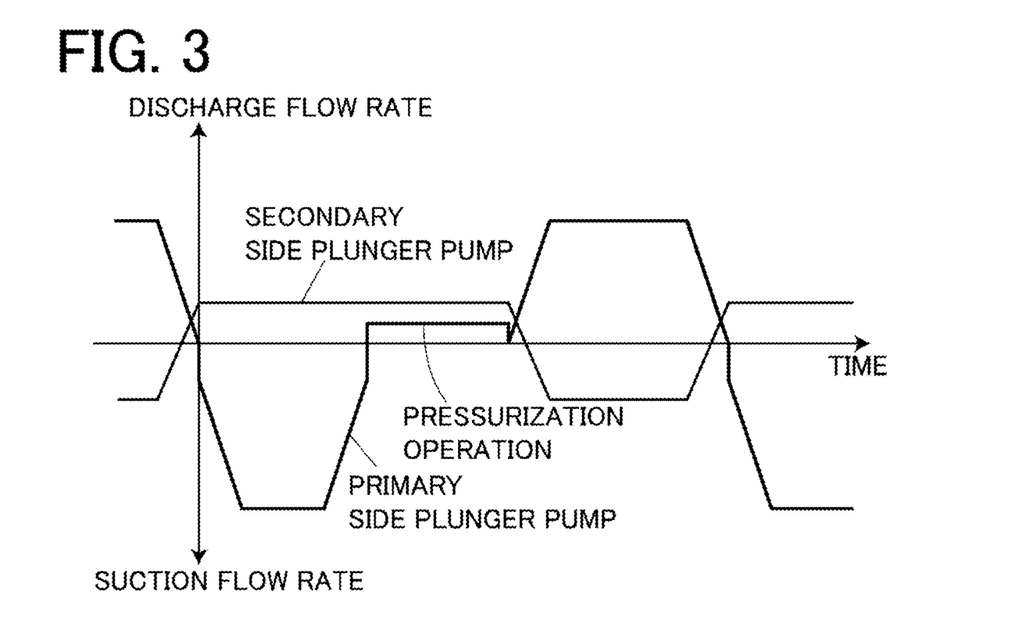
FIG. 3 is a graph for explaining operation of each plunger pump of the embodiment.

Since the liquid delivery device 1 is a liquid delivery device of a series type, as shown in FIG. 3, while the primary side plunger pump 2a performs discharge operation, the secondary side plunger pump 2b performs suction operation at a flow rate smaller than a discharge flow rate of the primary side plunger pump 2a, and the secondary side plunger pump 2b sucks part of the mobile phase discharged from the primary side plunger pump 2a. Therefore, while the primary side plunger pump 2a performs the discharge operation, the mobile phase is delivered at a flow rate obtained by subtracting a suction flow rate of the secondary side plunger pump 2b from a discharge flow rate of the primary side plunger pump 2a through the secondary side outlet pipe 38.

On the other hand, while the secondary side plunger pump 2b performs the discharge operation, the primary side plunger pump 2a performs the suction operation and the pre-compression operation. The "pre-compression operation" is operation to increase pressure in the pump chamber 6a after the suction operation of the primary side plunger pump 2a is completed to the same degree as pressure in the pump chamber 6b of the secondary side plunger pump 2b, that is, the system pressure. During the pre-compression operation, the mobile phase in the pump chamber 6a is compressed to generate heat, and the pressure in the pump chamber 6a rises. That is, in this embodiment, the primary side plunger pump corresponds to a "pressurizing pump" that pressurizes and then discharges a mobile phase.

Here, according to heat transfer engineering, when a fluid flowing in a channel has a temperature difference with a channel wall surface (which is assumed to be isothermal) at an inlet of the channel, the temperature difference is known to be attenuated exponentially with respect to a channel length from the inlet. A characteristic length at which the temperature difference becomes 1/e=37% of the inlet depends on a flow rate, thermal diffusivity of the fluid, and the cross-sectional shape of the channel.

The characteristic length required to cool the mobile phase that generates heat in the pump chamber 6a of the primary side plunger pump 2a will calculated. Assume that a discharge flow rate of the primary side plunger pump 2a is 2 mL/min. The thermal diffusivity of the mobile phase is slightly different between water and an organic solvent, but is typically within the range of $1.0 \times 10^{-7}$ to $1.5 \times 10^{-7}$ m²/s. The characteristic length required to cool the mobile phase that is calculated by using the above numerical values is about 20 to 30 mm. Note that, the cross-sectional shape of the channel is assumed to be a circular pipe. It is known that this model length does not depend on an inner diameter of the circular pipe. This result means that 37% of generated heat still remains even if the mobile phase that generates heat passes through a channel of about 30 mm in length.

Since a diameter of a pump head of a typical plunger pump is 30 to 50 mm, in a case where an outlet channel is provided vertically from a pump chamber of the pump head, the length of the outlet channel is about 15 to 25 mm. This is similar to or shorter than the characteristic length calculated above and is not sufficient to cool the heated mobile phase. For this reason, in the prior art, the mobile phase in a state where heat generated at the time of the pre-compression operation remains is sucked into the pump chamber of the secondary side plunger pump through the primary side outlet pipe. This complicates and makes it difficult to understand the cooling process, and the effectiveness of the feedforward control of the primary side plunger pump taking into consideration thermal expansion and contraction of the mobile phase is impaired.

Referring back to FIG. 1, the cooling part 22 is provided to cause the pump head 4a to absorb the heat of the mobile phase generated during the pre-compression operation described above. For this reason, the cooling block 20 is thermally integrated with the pump head 4a, and heat absorbed by the cooling block 22 from the mobile phase in the cooling part 22 is released to the pump head 4a. In this manner, the mobile phase which is discharged from the pump chamber 6a and flows into the cooling part 22 is cooled to a temperature at the same level as that of the pump head 4a. Here, being thermally integrated means that, for example, the cooling block 20 and the pump head 4a are in a state of being mechanically fastened under a sufficient contact area as shown in FIG. 1.

Figure 2:
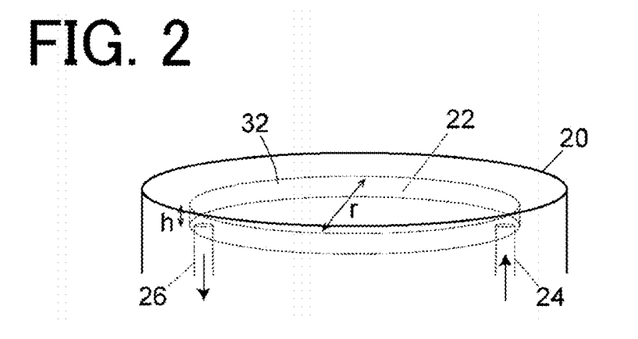
FIG. 2 is a perspective view showing an example of a structure of a cooling part of the embodiment.

FIG. 2 shows an example of a structure of the cooling part 22. The cooling part 22 in this example is a flat plate-shaped channel in which a ratio of an internal surface area to internal capacity is larger than that of the outlet channel 10a. As the ratio of the internal surface area to the internal capacity (internal surface area/internal capacity) is larger, the efficiency with which the cooling block 20 absorbs heat from the mobile phase flowing inside the cooling part 22 is more improved. Such a flat plate-shaped channel may have a circular or oval planar shape. A minimum width r in that case is 10 mm or less, more preferably 5 mm or less. Further, a channel depth h is 1 mm or less, more preferably 0.5 mm or less. A ratio of a minimum width to the depth is preferably 2 or more, more preferably 5 or more, and further preferably 10 or more. Internal capacity of the channel having a flat plate shape is preferably 20 uL or less, more preferably 10 uL or less, and further preferably 5 uL or less.

Figure 5A:
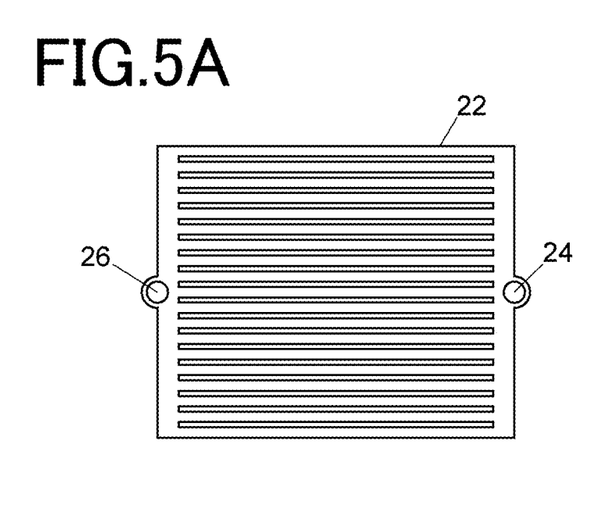
FIG. 5A is a plan view showing another structural example of the cooling part.
Figure 5B:
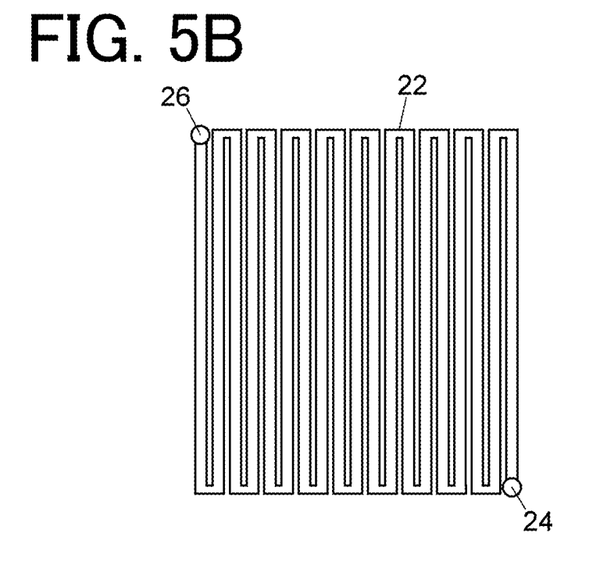
FIG. 5B is a plan view showing still another structural example of the cooling part.

Note that the structure of the cooling part 22 is not limited to the example shown in FIG. 2. The cooling part 22 may be provided with a plurality of parallel channels between the inflow channel 24 and the outflow channel 26 as shown in FIG. 5A, or may be one meandering channel connecting the inflow channel 24 and the outflow channel 26 as shown in FIG. 5B. In a case where the cooling part 22 has the structure shown in FIG. 5A or 5B, the heat quantity of the mobile phase at a typical flow rate of 2 mL/min can be reduced to 37% if the total channel length is 30 mm or more, to $(37\%)^2=14\%$ if the total channel length is 60 mm or more, and to $(37\%)^3=5\%$ if the total channel length is 90 mm or more. If the total channel length is 120 mm or more, the heat quantity can be reduced to $(37\%)^4=2\%$. The channel depth and the channel width, which do not affect the characteristic length required for cooling, can be typically designed in the range of 0.05 mm to 0.5 mm, and more preferably designed in the range of 0.1 mm to 0.3 mm. The channel depth and the channel width are preferably selected according to the requirements of processing accuracy and internal capacity. The internal capacity is preferably 20 uL or less, more preferably 10 uL or less, and further preferably 5 uL or less.

The structure of the cooling part 22 shown in FIG. 2, FIG. 5A, and FIG. 5B can be manufactured by processing a channel by removal processing, such as machining, etching, sand blast, and electrical discharge machining, and sealing by diffusion bonding, welding, or simply using packing or a gasket.

The mobile phase discharged from the pump chamber 6a is cooled to a temperature similar to that of the pump head 4a in the cooling part 22 and then flows through the primary side outlet pipe 30, and is introduced into the pump head 4b of the secondary side plunger pump 2b. Since the heat capacity of the primary side outlet pipe 30 is smaller than that of the pump head 4a, the primary side outlet pipe 30 is more susceptible to fluctuations in ambient temperature than the pump head 4a, and a temperature of the primary side outlet piping 30 may be different from a temperature of the pump head 4a. In this case, the temperature of the mobile phase cooled to the same level as that of the pump head 4a changes while the mobile phase flows through the primary side outlet pipe 30, which affects the reproducibility of the cooling process of the mobile phase.

Figure 4:
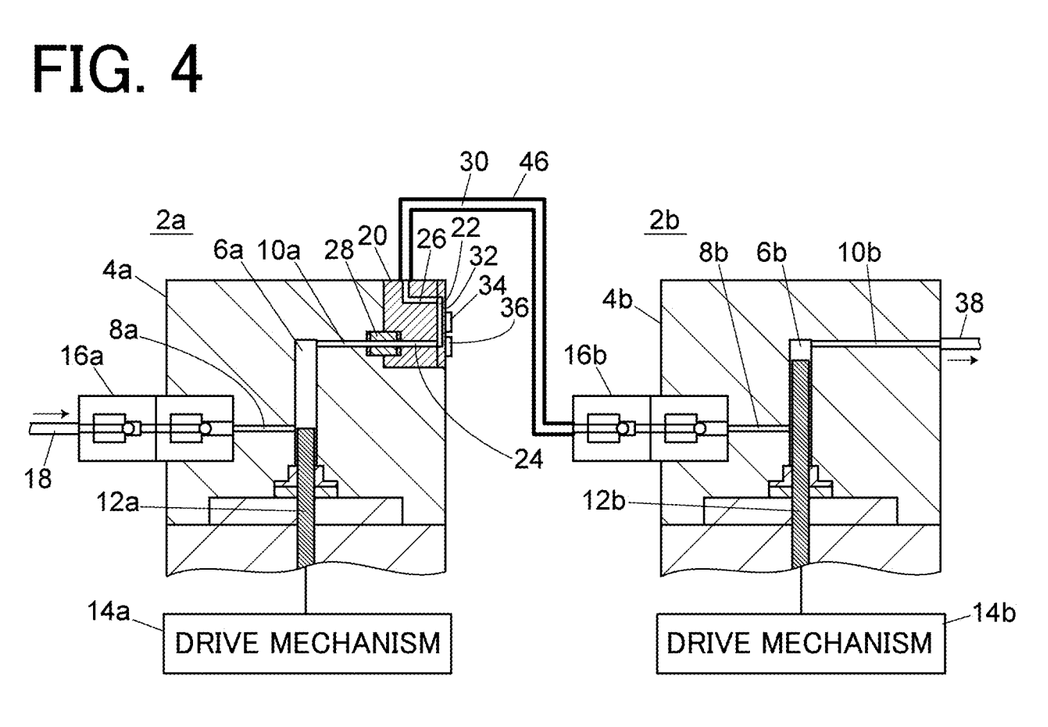
FIG. 4 is a diagram showing an example in which a primary side outlet pipe of the embodiment has a heat insulating structure.

In the embodiment of FIG. 4, the stability of a temperature of the primary side outlet pipe 30 is improved by covering the primary side outlet pipe 30 with a heat insulating member 46. Examples of the heat insulating member 46 that covers the primary side outlet pipe 30 include a resin coating, a foamed member, and the like. Note that, in order to obtain an effect similar to that of the heat insulating member 46, the primary side outlet pipe 30 may be accommodated in space thermally isolated from the surroundings by a heat insulating material, or the entire part including the primary side outlet pipe 30 and the primary side pump head 4a of the primary side plunger pump 2a and the pump head 4b of the secondary side plunger pump 2b may be accommodated in such space.

Returning to FIG. 1 and continuing the description, one wall surface 32 of the cooling block 20 that defines the cooling part 22 is configured to be elastically deformed according to the pressure in the cooling part 22. A strain sensor 34 (strain detection part) that detects an amount of strain of the wall surface 32 is attached to the wall surface 32 of the cooling block 20, and a signal of the strain sensor 34 is input to a control part 40 that controls operation of the drive mechanisms 14a and 14b. The control part 40 is implemented by a dedicated computer of the liquid delivery device 1 or a general-purpose personal computer.

The control part 40 includes a pressure detection part 42 that is configured to obtain a pressure value in the cooling part 22 based on the signal value from the strain sensor 34, and a calorific value calculation part 44 configured to calculate a calorific value of the mobile phase in the pump chamber 6a based on a change amount in the pressure value. The control part 40 is provided with data indicating a relationship between the signal value from the strain sensor 34 and the pressure value in the cooling part 22, and the pressure detection part 42 is configured to determine the pressure value in the cooling part 22 based on the data.

A pressure value in the cooling part 22 obtained by a pressure detection part 42 is used for the pre-compression operation of the primary side plunger pump 2a. The control part 40 is configured to control the drive mechanism 14a, so that the pressure in the cooling part 22 obtained by the pressure detection part 42 has a value similar to that of the pressure (system pressure) in the pump chamber 6b of the secondary side plunger pump 2b when the primary side plunger pump 2a performs pre-compression operation. The control part 40 receives a detection signal from a pressure sensor (not shown) that detects the system pressure.

Further, a temperature sensor 36 that detects a temperature of the cooling part 22 is attached to the cooling block 20, and an output signal of the temperature sensor 36 is also input to the control part 40. Note that although the temperature sensor 36 is not an essential constituent, a temperature of the mobile phase in the pump chamber 6a can be monitored by providing the temperature sensor 36. If a change amount in temperature of the mobile phase in the pump chamber 6a at the time of pre-compression operation of the primary side plunger pump 2a is obtained, a calorific value of the mobile phase in the pump chamber 6a at the time of pre-compression can be determined. Therefore, in a case where the temperature sensor 36 is provided, the calorific value calculation part 44 may be configured to obtain the calorific value of the mobile phase based on a change amount in an output signal from the temperature sensor 36 without using the pressure value obtained by the pressure detection part 42.

Further, both the strain sensor and the temperature sensor described above may be provided. At this time, each of the sensors can be used to calculate the calorific value of the mobile phase as described above. Furthermore, the temperature sensor can also be used to correct temperature characteristics of the strain sensor. In this manner, even in a case where the temperature of the strain sensor changes due to heat generation of the mobile phase, the output of the strain sensor can be corrected using the temperature detected by the temperature sensor, and an accurate pressure can be measured.

The calorific value of the mobile phase in the pump chamber 6a obtained by the calorific value calculation part 44 can be used to control the driving speed of the plunger 12a at the time of the discharge operation of the primary side plunger pump 2a. That is, if the calorific value of the mobile phase in the pump chamber 6a is known, it is possible to obtain the size of a loss amount of the liquid delivery flow rate caused by the thermal expansion of the mobile phase due to the heat generation and the subsequent thermal contraction due to cooling in the cooling part 22. Accordingly, by driving the plunger 12a so as to guarantee the loss amount, the stability of the liquid delivery flow rate can be maintained.

Note that the liquid delivery device according to the present invention is not limited to one having the configuration of the embodiment described above.

Hereinafter, another embodiment of the liquid delivery device will be described using FIGS. 6 and 7.

Figure 1:
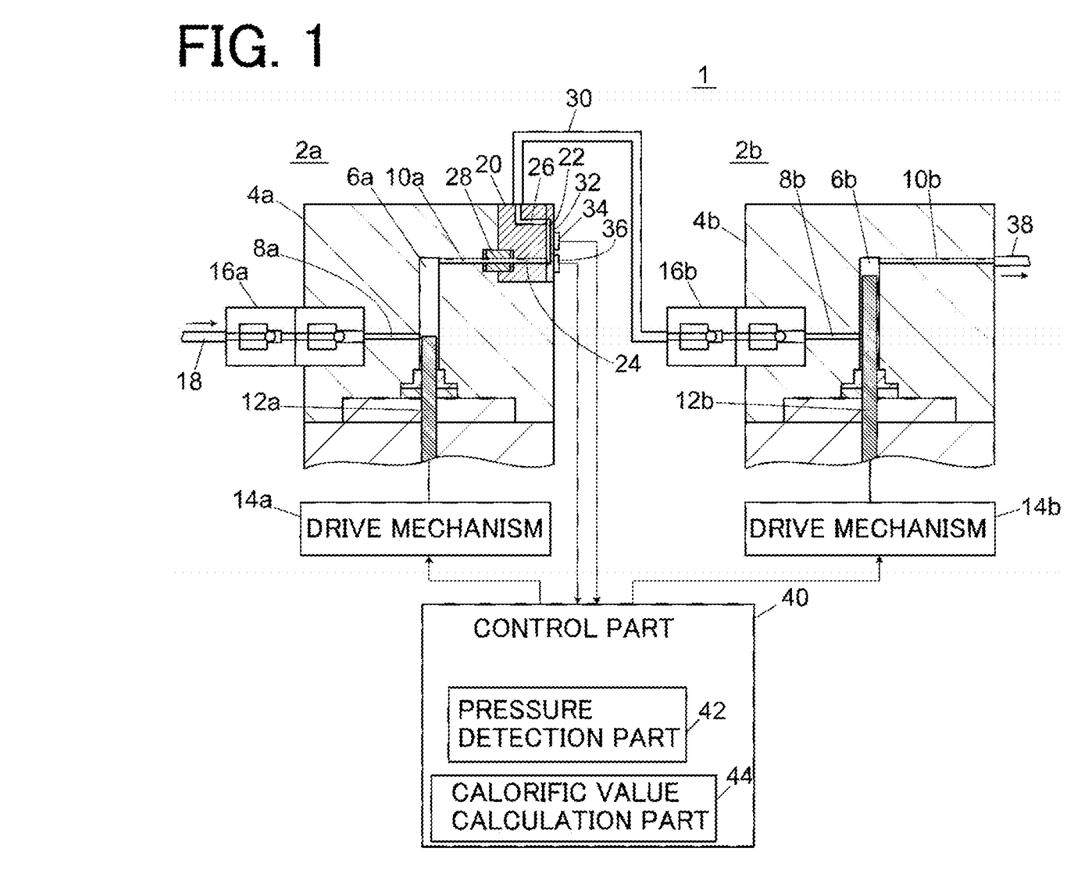
FIG. 1 is a schematic cross-sectional view showing an embodiment of a liquid delivery device.
Figure 6:
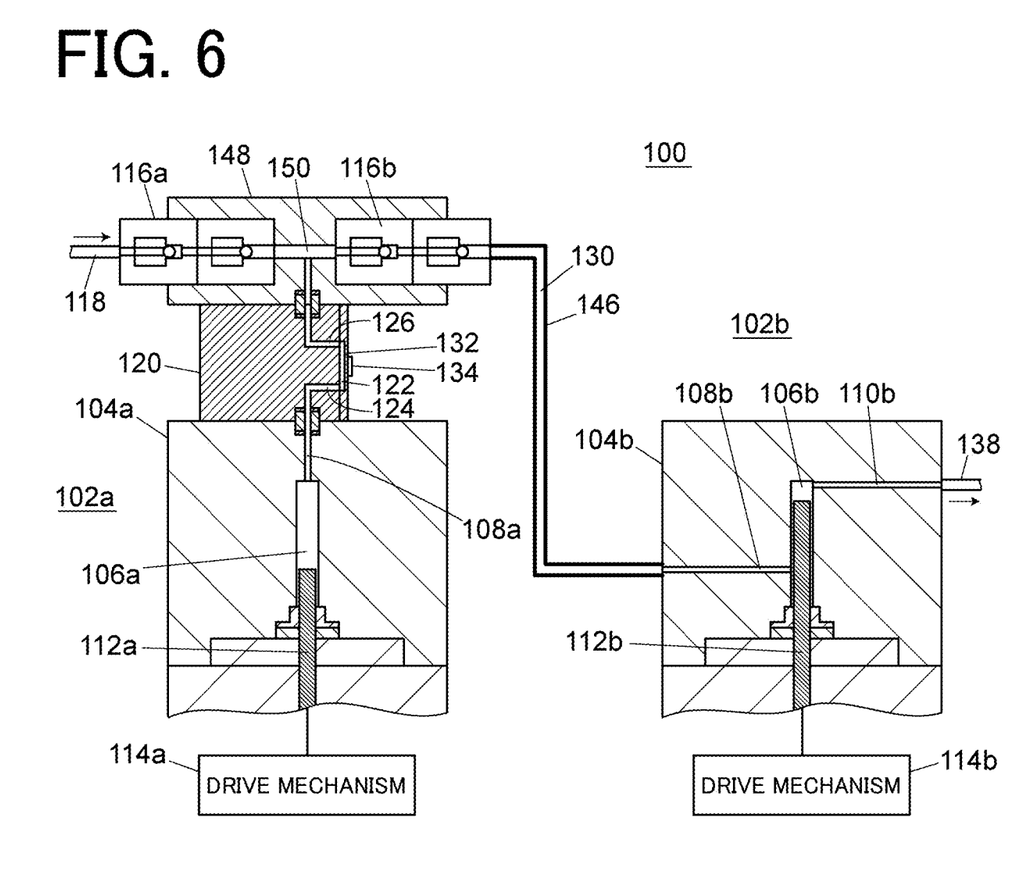
FIG. 6 is a schematic cross-sectional view showing another embodiment of the liquid delivery device.

A liquid delivery device 100 of the embodiment of FIG. 6 is a liquid delivery device of a series double plunger type, as similar to the liquid delivery device 1 of FIG. 1. A primary side plunger pump 102a and a secondary side plunger pump 102b are connected in series to each other, and perform the operation shown in FIG. 3 like the liquid delivery device 1. That is, the primary side plunger pump 102a performs suction operation and pre-compression operation during discharge operation of the secondary side plunger pump 102b, and corresponds to the "pressurizing pump" that pressurizes and then discharges the mobile phase in a pump chamber 106a.

The pump chamber 106a and a suction and discharge channel 108a are provided in a pump head 104a of the primary side plunger pump 102a. The suction and discharge channel 108a has one end communicating with a tip of the pump chamber 106a and is provided to extend from the tip of the pump chamber 106a in an axial direction of a plunger 112a.

In this embodiment, a cooling block 120 is mounted on a tip of the pump head 104a of the primary side plunger pump 102a. The cooling block 120 is equivalent to the cooling block 20 in the liquid delivery device 1 of FIG. 1 and includes a cooling part 122, an inflow channel 124, and an outflow channel 126 in the inside. The other end of the suction and discharge channel 108a communicates with the cooling part 122 via the inflow channel 124, and the cooling part 122 further communicates with an inlet channel 150 via the outflow channel 126.

The inlet channel 150 is a channel provided in an inlet block 148 provided on the cooling block 120 on the opposite side to the pump head 104a. One end of the inlet channel 150 is connected to an inlet pipe 118 via a check valve 116a, and the other end of the inlet channel 150 is connected to a primary side outlet pipe 130 via a check valve 116b. The check valve 116a is opened when the plunger 112a is driven in a suction direction by a drive mechanism 114a, and is closed when the plunger 112a is driven in a discharge direction. On the other hand, the check valve 116b is closed when the pressure in a pump chamber 106b is higher than the pressure in the pump chamber 106a, and is opened when the pressure in the pump chamber 106a is higher than the pressure in the pump chamber 106b.

Note that, in this embodiment, the primary side outlet pipe 130 is covered with the heat insulating member 146. However, the heat insulating member 146 is not an essential component.

In the liquid delivery device 100, the mobile phase flows through the cooling part 122 in either the suction operation or the discharge operation of the primary side plunger pump 102a. In this manner, the temperature of the mobile phase sucked into the pump chamber 106a of the primary side plunger pump 102a can be made similar to that of the pump head 104a, and, even in an environment where the temperature of the sucked mobile phase fluctuates due to a room temperature fluctuation, the temperature of the delivered mobile phase can be stabilized more, and the stability of the liquid delivery flow rate can be further improved.

The configuration of the secondary side plunger pump 102b of the liquid delivery device 100 is similar to that of the secondary side plunger pump 2b of the liquid delivery device 1 of FIG. 1, and the pump heads 4b and 104b, the pump chambers 6b and 106b, the inlet channel 8b and 108b, the outlet channels 10b and 110b, the plungers 12b and 112b, the drive mechanisms 14b and 114b, and the outlet channels 38b and 138b correspond to each other.

Like the wall surface 32 of the cooling block 20 of the liquid delivery device 1 of FIG. 1, one wall surface 132 of the cooling block 120 of the liquid delivery device 100 is configured to be elastically deformed in accordance with the pressure in the cooling part 122. Then, a strain sensor 134 that detects an amount of strain of the wall surface 132 is attached to the cooling block 120, and the pressure in the cooling part 122 can be detected based on the amount of strain of the wall surface 132. Note that the configuration of the wall surface 132 and the strain sensor 134 are not essential constituents.

Figure 7:
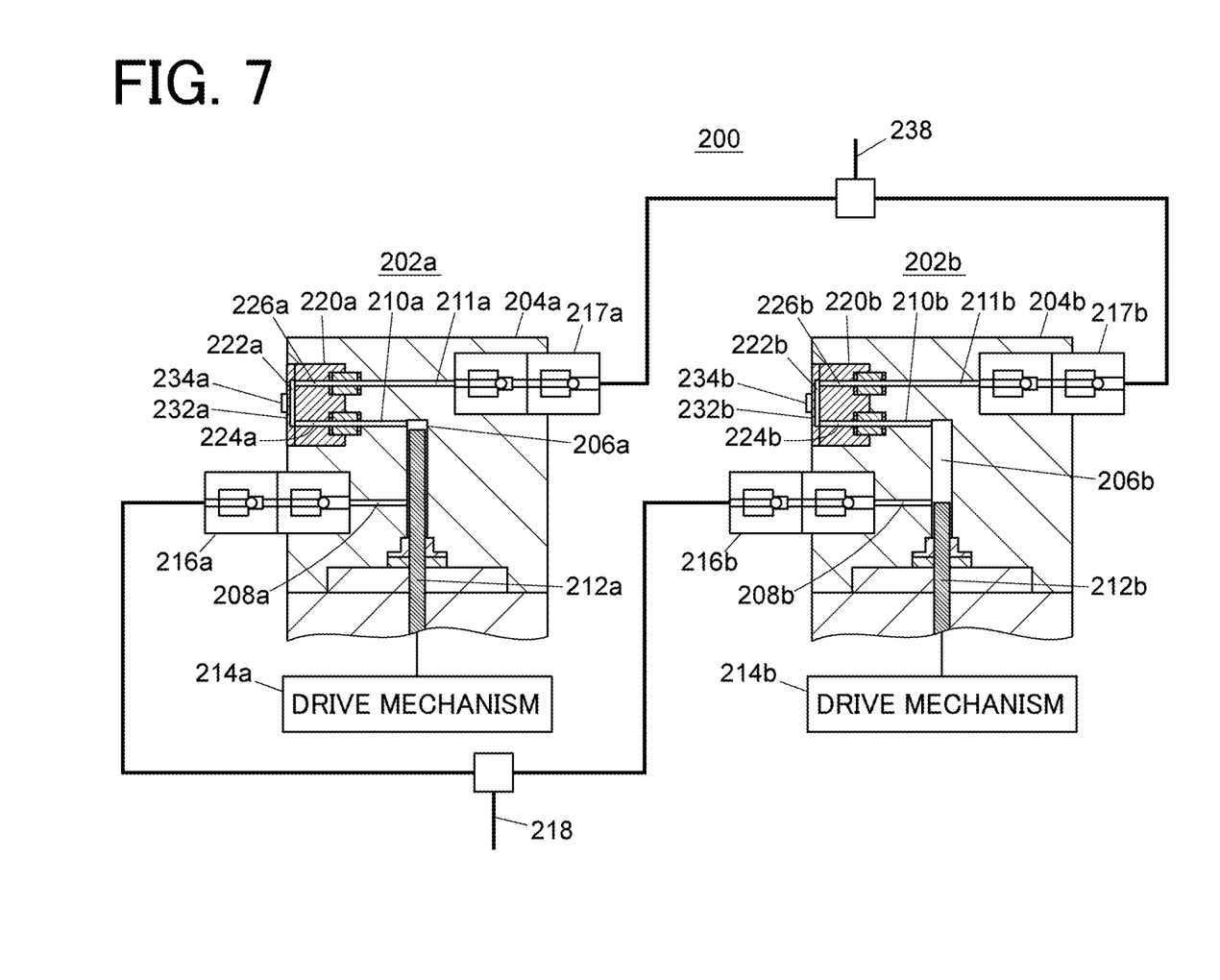
FIG. 7 is a schematic cross-sectional view showing still another embodiment of the liquid delivery device.

A liquid delivery device 200 of the embodiment of FIG. 7 is a liquid delivery device of a parallel type double plunger type in which two plunger pumps 202a and 202b are connected in parallel. The plunger pumps 202a and 202b alternately perform suction operation and discharge operation, and while one plunger pump is performing the discharge operation, the other plunger pump performs the suction operation and pre-compression operation. That is, in this liquid delivery device 200 of a parallel type, both the plunger pumps 202a and 202b correspond to the "pressurizing pump" which discharges after pressurizing the mobile phase in pump chamber 206a, 206b.

Since both of the plunger pumps 202a and 202b correspond to the "pressurizing pumps", cooling blocks 220a and 220b are attached to both of these plunger pumps 202a and 202b. The cooling blocks 220a and 220b are equivalent to the cooling block 20 in the liquid delivery device 1 of FIG. 1, and include cooling parts 222a and 222b for cooling the mobile phase discharged from the pump chambers 206a and 206b of the plunger pumps 202a and 202b in the inside.

In a pump head 204a of the plunger pump 202a, the pump chamber 206a, an inlet channel 208a, an outlet channel 210a, and an post-cooling outlet channel 211a are provided. A tip of a plunger 212a is slidably accommodated in the pump chamber 206a, and is configured to reciprocate in an axial direction by a drive mechanism 214a.

The inlet channel 208a has one end communicating with the pump chamber 206a, and the other end connected to an inlet pipe 218 via a check valve 216a. The inlet pipe 218 is also connected to an inlet channel 208b of the plunger pump 202b via a check valve 216b.

The outlet channel 210a has one end communicating with a tip of the pump chamber 206a and the other end connected to an inlet channel 224a communicating with the cooling part 222a via a joint. The post-cooling outlet channel 211a has one end connected to an outlet channel 226a of the cooling block 220a via a joint, and the other end connected to an outlet pipe 238 via a check valve 217a. The outlet pipe 238 is also connected to a post-cooling outlet pipe 211b of the plunger pump 202b via a check valve 217.

As in the wall surface 32 of the cooling block 20 of the liquid delivery device 1 of FIG. 1, one wall surface 232a of the cooling block 220a is configured to be elastically deformed in accordance with the pressure in the cooling part 222a. Then, a strain sensor 234a that detects an amount of strain of the wall surface 232a is attached to the cooling block 220a, and the pressure in the cooling part 222a can be detected based on the amount of strain of the wall surface 232a. Note that the wall surface 232a and the strain sensor 234a are not essential constituents.

The plunger pumps 202b has the same configuration as the plunger pump 202a, and parts corresponding to constituents of the plunger pump 202a are assigned the same numbers, where only signed attached after those numbers are different between "a" and "b".

As in the above-described embodiment, in the liquid delivery device 200 of a parallel type double plunger type, by providing the cooling parts 222a and 222b for the pump heads 204a and 204b of the plunger pumps 202a and 202b respectively, the mobile phase that has generated heat at the time of pre-compression operation can be cooled to a temperature similar to that of the pump heads 204a and 204b before being delivered. In this manner, the reproducibility of the cooling process of the mobile phase sucked by each plunger pumps 202a and 202b is improved.

Note that, although not particularly shown in FIG. 7, for a pipe provided outside the pump heads 204a and 204b, such as the outlet pipe 238, through which the mobile phase discharged from the plunger pumps 202a and 202b flows, measures may be taken to prevent the influence of a temperature fluctuation in the surrounding environment, in such a manner as covering with a heat insulating member, as in the case of the outlet pipe 38 in FIG. 4.

Figure 8:
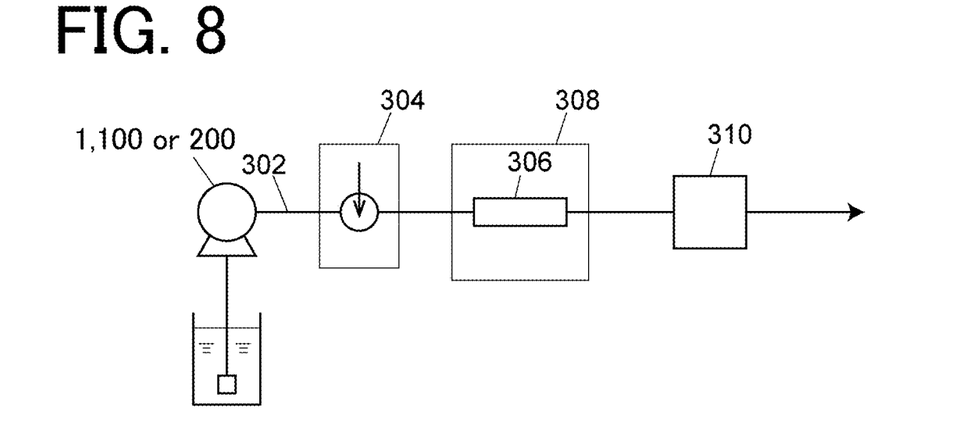
FIG. 8 is a schematic block diagram of a channel showing an embodiment of a fluid chromatograph.

FIG. 8 is a channel configuration diagram of a liquid chromatograph which is one embodiment of a fluid chromatograph including the liquid delivery device 1, 100, or 200 demonstrated above.

The liquid chromatograph of this embodiment includes an analysis channel 302, the above-described liquid delivery device 1, 100, or 200, a sample injection part 304, a separation column 306, a column oven 308, and a detector 310. The liquid delivery device 1, 100, or 200 is provided to deliver the mobile phase in the analysis channel 302. The sample injection part 304 is an autosampler that automatically injects a sample into the analysis channel 302. The separation column 306 is provided downstream of the sample injection part 304 on the analysis channel 302, and is for separating the sample injected by the sample injection part 304 into components. The separation column 306 is housed in the column oven 308 and has a temperature controlled at a set temperature. The detector 310 is provided downstream of the separation column 306 on the analysis channel 302 and is for detecting a sample component separated in the separation column 306.

In the liquid chromatograph of this embodiment, the liquid delivery device 1, 100, or 200 is configured to deliver a single mobile phase to the sample injection part 304. As another embodiment, different mobile phases delivered by a plurality of liquid delivery devices may be mixed and delivered to the sample injection part 304. Such a configuration is generally known as a "high pressure gradient". Further, as another different embodiment, a plurality of mobile phases may be mixed and supplied to the liquid delivery device 1, 100, or 200 via a mobile phase switching valve or a proportional valve, and delivered to the sample injection part 304. Such a configuration is generally known as a "low pressure gradient". The liquid delivery device 1, 100, or 200 disclosed in the present invention can also be applied to liquid chromatographs of various channel configurations other than the embodiment shown in FIG. 8.

Note that, although FIG. 8 shows the liquid chromatograph as an embodiment of a fluid chromatograph, the present invention can be similarly applied to a supercritical fluid chromatograph.

The invention claimed is:

1. A liquid delivery device comprising:
   at least one or more plunger pumps, wherein the at least one or more plunger pumps each include a pump head having a pump chamber provided in an inside, a plunger having a tip which is slidably inserted into the pump chamber, and a drive mechanism that reciprocates the plunger in an axial direction thereof,
   at least one of the at least one or more plunger pumps is a pressurizing pump that pressurizes a mobile phase including a compressible fluid sucked into the pump chamber and then discharges the mobile phase from the pump chamber, and
   at least the pump head of the pressurizing pump includes a cooling part formed by at least one channel connected with an outlet channel of the pump chamber, the cooling part is configured to cause the pump head to absorb heat of a mobile phase that is discharged from the pump chamber and flows into the at least one channel, and is provided to cool the mobile phase.

2. The liquid delivery device according to claim 1, wherein the at least one channel forming the cooling part is a flat plate-shaped channel in which a ratio of an internal surface area to internal capacity is larger than that of the outlet channel.

3. The liquid delivery device according to claim 1, wherein the at least one channel forming the cooling part is a plurality of channels having a smaller cross-sectional area than the outlet channel.

4. The liquid delivery device according to claim 1, wherein the at least one channel forming the cooling part is a plurality of channels having a smaller cross-sectional area than the outlet channel and meander.

5. The liquid delivery device according to claim 2,
   wherein one wall surface of the at least one channel forming the cooling part is configured to generate an elastic strain in accordance with pressure in the at least one channel,
   the liquid delivery device further comprising:
      a strain detection part that detects an amount of strain of the wall surface; and
      a pressure detection part that detects pressure in the cooling part based on an amount of strain of the wall surface detected by the strain detection part.

6. The liquid delivery device according to claim 1, further comprising a temperature detection part that detects a temperature of the cooling part.

7. The liquid delivery device according to claim 5, further comprising a calorific value calculation part that calculates a calorific value of a mobile phase in the pump chamber based on a change amount of a pressure value detected by the pressure detection part.

8. The liquid delivery device according to claim 6, further comprising a calorific value calculation part that calculates a calorific value of a mobile phase in the pump chamber based on a change amount of a temperature detected by the temperature detection part.

9. The liquid delivery device according to claim 1 comprising an outlet pipe disposed outside the pump head of the pressurizing pump and communicating with the outlet channel, the outlet pipe is covered with a heat insulating member.

10. A fluid chromatograph at least comprising:
    an analysis channel;
    a liquid delivery device that includes at least one or more plunger pumps,
    wherein the at least one or more plunger pumps each include a pump head having a pump chamber provided in an inside, a plunger having a tip which is slidably inserted into the pump chamber, and a drive mechanism that reciprocates the plunger in an axial direction thereof,
    at least one of the at least one or more plunger pumps is a pressurizing pump that pressurizes a mobile phase including a compressible fluid sucked into the pump chamber and then discharges the mobile phase from the pump chamber, and at least the pump head of the pressurizing pump includes a cooling part formed by at least one channel connected with an outlet channel of the pump chamber, the cooling part is configured to cause the pump head to absorb heat of a mobile phase that is discharged from the pump chamber and flows into the at least one channel, and is provided to cool the mobile phase;

the liquid delivery device that delivers a mobile phase in an analysis channel;

a sample injection part that injects a sample into the analysis channel;

a separation column that is provided downstream of the sample injection part on the analysis channel, and separates a sample injected into the analysis channel by the sample injection part into components; and a detector that is provided downstream of the separation column on the analysis channel and detects the components separated by the separation column.

* * * * *